United States Patent
Ito et al.

(10) Patent No.: US 9,996,633 B2
(45) Date of Patent: Jun. 12, 2018

(54) DEVICE FOR CREATING FACILITY DISPLAY DATA, FACILITY DISPLAY SYSTEM, AND PROGRAM FOR CREATING DATA FOR FACILITY DISPLAY

(71) Applicant: DENSO CORPORATION, Kariya, Aichi-pref. (JP)

(72) Inventors: Masaya Ito, Kariya (JP); Hiroki Ukai, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 324 days.

(21) Appl. No.: 14/435,752

(22) PCT Filed: Sep. 26, 2013

(86) PCT No.: PCT/JP2013/005701
§ 371 (c)(1),
(2) Date: Apr. 15, 2015

(87) PCT Pub. No.: WO2014/061207
PCT Pub. Date: Apr. 24, 2014

(65) Prior Publication Data
US 2015/0339406 A1 Nov. 26, 2015

(30) Foreign Application Priority Data
Oct. 19, 2012 (JP) ................................ 2012-231733

(51) Int. Cl.
*G06F 17/30* (2006.01)
*H04L 29/06* (2006.01)
(Continued)

(52) U.S. Cl.
CPC ... *G06F 17/30991* (2013.01); *G01C 21/3679* (2013.01); *G06F 17/30657* (2013.01);
(Continued)

(58) Field of Classification Search
CPC ......... G06F 17/30991; G06F 17/30657; G06F 17/30696; G06F 17/3069; G06F 17/30985; H04L 67/18; H04L 67/42; G01C 21/3679
See application file for complete search history.

(56) References Cited

U.S. PATENT DOCUMENTS 8,015,172 B1 * 9/2011 Cave ................... G06F 17/3087
707/706
8,463,774 B1 * 6/2013 Buron ............... G06F 17/30861
707/724
(Continued)

FOREIGN PATENT DOCUMENTS

CN 102473181 A 5/2012
JP 2002188929 A 7/2002
(Continued)

OTHER PUBLICATIONS

International Search Report and Written Opinion (in Japanese with English Translation) for PCT/JP2013/005701, dated Oct. 29, 2013; ISA/JP.

*Primary Examiner* — Leslie Wong
(74) *Attorney, Agent, or Firm* — Harness, Dickey & Pierce, P.L.C.

(57) ABSTRACT

A facility display data creating device is provided. The device includes: a first processing unit that retrieves a first facility information group from a first database; a second processing unit that retrieves a second facility information group from a second database; a third processing unit that determines whether any of facilities indicated by the first facility information group corresponds to any of the facilities indicated by the second facility information group; and a fourth processing unit that creates display data to display facility information by combining and sorting the first and second facility information groups in an order of distance
(Continued)

from a predetermined position, and that creates the display data to display the facility information of the corresponding facilities adjacently to each other and independently of the order of distance on condition that the corresponding facilities are determined.

10 Claims, 11 Drawing Sheets

(51) Int. Cl.
H04W 4/00 (2018.01)
G01C 21/36 (2006.01)
H04L 29/08 (2006.01)
(52) U.S. Cl.
CPC .. *G06F 17/30696* (2013.01); *G06F 17/30985* (2013.01); *H04L 67/18* (2013.01); *H04L 67/42* (2013.01); *H04W 4/008* (2013.01)

(56) References Cited

U.S. PATENT DOCUMENTS

| | | | | |
|---|---|---|---|---|
| 8,566,029 B1* | 10/2013 | Lopatenko | ........... | G08G 1/0962 701/400 |
| 9,552,334 B1* | 1/2017 | Meisels | ................. | G06F 17/218 |
| 2002/0013656 A1* | 1/2002 | Namba | .............. | G01C 21/3679 701/516 |
| 2003/0093419 A1* | 5/2003 | Bangalore | .......... | G01C 21/3664 |
| 2003/0191580 A1* | 10/2003 | Endo | ................. | G01C 21/3415 701/420 |
| 2004/0198386 A1* | 10/2004 | Dupray | ................ | H04W 64/00 455/456.1 |
| 2004/0204821 A1* | 10/2004 | Tu | ...................... | G01C 21/3679 701/527 |
| 2006/0020373 A1* | 1/2006 | Abe | .................... | G01C 21/3679 701/1 |
| 2008/0009268 A1* | 1/2008 | Ramer | .............. | G06F 17/30867 455/412.1 |
| 2008/0076451 A1* | 3/2008 | Sheha | ................. | G01C 21/3679 455/456.3 |
| 2008/0140647 A1* | 6/2008 | Bailey | ............... | G06F 17/30864 |
| 2009/0005961 A1* | 1/2009 | Grabowski | .......... | G01C 21/365 701/532 |
| 2009/0088964 A1* | 4/2009 | Schaaf | ................. | G01C 21/367 701/532 |
| 2009/0157306 A1 | 6/2009 | Mitsugi | | |
| 2009/0276398 A1* | 11/2009 | Naganuma | ........ | G06F 17/30598 |
| 2009/0319348 A1* | 12/2009 | Khosravy | .............. | G01C 21/20 705/14.1 |
| 2011/0098918 A1* | 4/2011 | Siliski | .................. | G01C 21/265 701/533 |
| 2012/0066240 A1 | 3/2012 | Morimoto et al. | | |
| 2013/0326384 A1* | 12/2013 | Moore | ............... | G01C 21/3638 715/771 |
| 2014/0229502 A1* | 8/2014 | Josefiak | ............. | G01C 21/3667 707/769 |

FOREIGN PATENT DOCUMENTS

| | | |
|---|---|---|
| JP | 2005227117 A | 8/2005 |
| JP | 2006010458 A | 1/2006 |
| JP | 2006038557 A | 2/2006 |
| JP | 2007205894 A | 8/2007 |
| JP | 2008-134308 A | 6/2008 |
| WO | WO-2007066439 A1 | 6/2007 |

* cited by examiner

FIG. 7

| | SEARCH RESULT | DISTANCE |
|---|---|---|
| Icon A | SUSHI-BAR V1 | 100m |
| Icon A | KAPPO V2 | 150m |
| Icon A | JAPANESE FOOD RESTAURANT V3 | 200m |
| Icon A | JAPANESE FOOD PUB V4 | 250m |
| Icon A | CREATIVE JAPANESE-STYLE FOOD V5 | 300m |
| ⋮ | ⋮ | ⋮ |

| | SEARCH RESULT | DISTANCE |
|---|---|---|
| Icon B | JAPANESE FOOD AND TEPPAN-YAKI V6 | 80m |
| Icon B | SEASONAL JAPANESE FOOD V10 | 270m |
| Icon B | NEW JAPANESE FOOD V7 | 500m |
| Icon B | GYU-NABE V8 | 550m |
| Icon B | JAPANESE-FOOD DINING RESTAURANT V9 | 600m |

FIG. 9

| | SEARCH RESULT | DISTANCE |
|---|---|---|
| Ca — Icon A | SUSHI-BAR V1 | 100m |
| Ca — Icon A | KAPPO V2 | 150m |
| Ca — Icon A | JAPANESE FOOD RESTAURANT V3 | 200m |
| Ca — Icon A | JAPANESE FOOD PUB V4 | 250m |
| Cb, Db — Icon B | SEASONAL JAPANESE FOOD V10 | 270m |
| Ca — Icon A | CREATIVE JAPANESE-STYLE FOOD V5 | 300m |
| ⋮ | ⋮ | ⋮ |

| | SEARCH RESULT | DISTANCE |
|---|---|---|
| Icon B | JAPANESE FOOD AND TEPPAN-YAKI V6 | 80m |
| Icon B | JAPANESE FOOD RESTAURANT V3 | 270m |
| Icon B | NEW JAPANESE FOOD V7 | 500m |
| Icon B | GYU-NABE V8 | 550m |
| Icon B | JAPANESE-FOOD DINING RESTAURANT V9 | 600m |
| ⋮ | ⋮ | ⋮ |

| | SEARCH RESULT | DISTANCE |
|---|---|---|
| Ca — Icon A | SUSHI-BAR V1 | 100m |
| Ca — Icon A | KAPPO V2 | 150m |
| Ca — Icon A | JAPANESE FOOD RESTAURANT V3 | 200m |
| Cb, Dc — Icon B | JAPANESE FOOD RESTAURANT V3 | 200m |
| Ca — Icon A | JAPANESE FOOD PUB V4 | 250m |
| Ca — Icon A | CREATIVE JAPANESE-STYLE FOOD V5 | 300m |
| ⋮ | ⋮ | ⋮ |

D1

DEVICE FOR CREATING FACILITY DISPLAY DATA, FACILITY DISPLAY SYSTEM, AND PROGRAM FOR CREATING DATA FOR FACILITY DISPLAY

CROSS REFERENCE TO RELATED APPLICATION APPLICATIONS

This application is a U.S. National Phase Application under 35 U.S.C. 371 of International Application No. PCT/JP2013/005701 filed on Sep. 26, 2013 and published in Japanese as WO 2014/061207 A1 on Apr. 24, 2014. This present application is based on and claims the benefit of priority from Japanese Patent Application No. 2012-231733 filed on Oct. 19, 2012. The entire disclosures of all of the above applications are incorporated herein by reference.

TECHNICAL FIELD

The present disclosure relates to a device for creating facility display data, a facility display system, and a program for creating data for facility display, in order to provide a combined display of facilities outputted from a plurality of databases.

BACKGROUND ART

In a navigation system, for example, when various conditions are inputted, a list of facilities which fulfill the conditions is displayed. In cases where such a system is provided with a plurality of databases, when common input data is inputted to a plurality of databases to search for facilities and when the databases provided are different, the output results may be different mutually. This is because the contents of the database are dependent on an information network of a contents provider (facility manager) who manages the database, and because the output results in the present case are different in spite of the same facility. This kind of related art is disclosed by Patent Document 1.

According to technology disclosed by Patent Document 1, facilities are searched for using a facility database stored in a DVD in a navigation device, and the facilities are searched for also using a facility database of an information center by transmitting a search word to the information center. Then, the results of these searches are compared. When the position of a facility searched in the navigation device and the position of a facility searched in the information center are within a predetermined range, both facilities are regarded as the same facility and the information on the facility retrieved from the facility database of the DVD is deleted, and either of the these items of facility information is displayed on the display unit.

PRIOR ART LITERATURES

Patent Literature

Patent Literature 1: JP-2006-38557A

SUMMARY OF INVENTION

However, even if the technology disclosed by Patent Document 1 is applied, a user can obtain only one or the other item of the information. Even if it is attempted to output both results, the facility information will be outputted as that of a completely different facility in spite of the same facility, leading to erroneous recognition by the user.

The object of the present disclosure is to provide a device for creating facility display data, a facility display system, and a program for creating data for facility display in which the facility information is displayed preventing erroneous recognition by the user as much as possible.

According to a first example of the present disclosure, a facility display data creating device comprises a first processing unit, a second processing unit, a third processing unit and a fourth processing unit. The first processing unit retrieves a first facility information group including facility information of one or more facilities from a first database according to input data. The second processing unit retrieves a second facility information group including facility information of one or more facilities from a second database according to the input data. The third processing unit determines whether any of the facilities indicated by the first facility information group corresponds to any of the facilities indicated by the second facility information group. The fourth processing unit creates display data to display facility information by combining and sorting the first facility information group and the second facility information group in an order of distance from a predetermined position, and that creates the display data to display the facility information of the corresponding facilities adjacently to each other and independently of the order of distance on condition that the corresponding facilities are determined by the third processing unit.

According to a second example of the present disclosure, a facility display system comprises: a server that includes the above facility display data creating device; and a client that transmits present-position information as information of the predetermined position to the server, receives a result from the server, and displays the result on a display screen of a display unit. The client receives the display data created by the fourth processing unit from the server, and displays the facility information of the corresponding facilities on the display screen of the display unit.

According to a third example of the present disclosure, a facility display data creating program causes a controller of a server or a client constituting a facility display data creating device to execute: retrieving a first facility information group including facility information of one or more facilities from a first database according to input data; retrieving a second facility information group including facility information of one or more facilities from a second database according to the input data; determining whether any of the facilities indicated by the first facility information group corresponds to any of the facilities indicated by the second facility information group; and creating display data to display facility information by combining and sorting the first facility information group and the second facility information group in an order of distance from a predetermined position, and creating the display data to display the facility information of the corresponding facilities adjacently to each other and independently of the order of distance on condition that the corresponding facilities are determined. This facility display data creating program may be stored in a non-transitory tangible storage medium.

According to the facility display data creating device, the facility display system, and the facility display data creating program as described above, the facility information is sorted in the order of distance from a predetermined position; however, as for corresponding facilities among the first facility database and the second facility database, the display data is created in order to display the corresponding facilities adjacently and independently of the order of distance. Therefore, when the created display data is displayed adjacently, it is possible to make a user recognize that the adjacently-displayed facility information is corresponding information; accordingly, it is possible to prevent erroneous recognition by the user as much as possible.

BRIEF DESCRIPTION OF DRAWINGS

The above and other objects, features, and advantages of the present disclosure will become more apparent from the below detailed description made with reference to the accompanying drawings. In the drawings:

FIG. 7 is a drawing illustrating an example of facility information outputted from a first database;

FIG. 8 is a drawing illustrating an example of facility information outputted from a second database;

FIG. 9 is a drawing illustrating an example of facility information in which a part of the facility information outputted from the second database is combined with the facility information of the first database;

FIG. 10 is a drawing illustrating another example of the facility information outputted from the second database;

FIG. 11 is a drawing illustrating another example of the facility information in which a part of the facility information outputted from the second database is combined with the facility information of the first database (No. 2)

EMBODIMENTS FOR CARRYING OUT INVENTION

Figure 1:
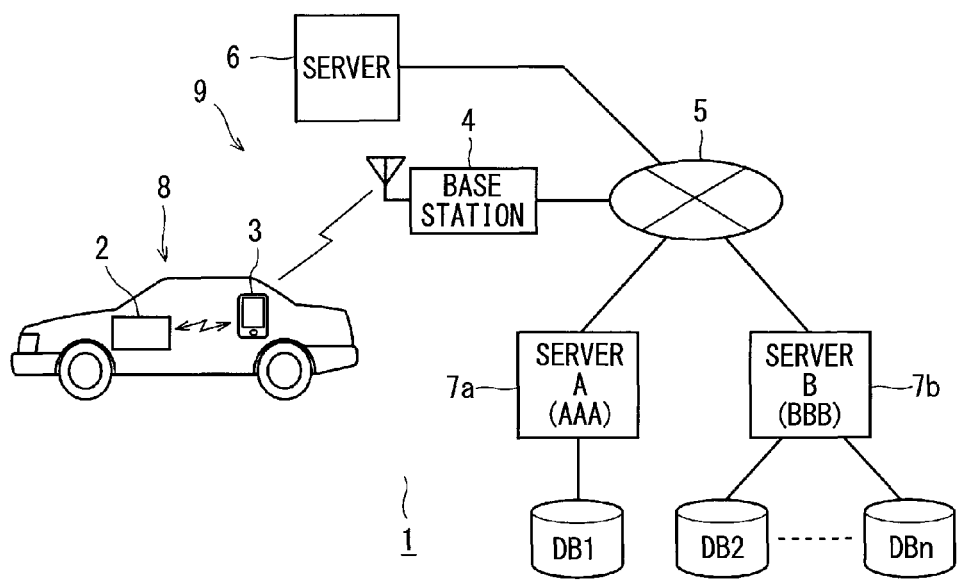
FIG. 1 is a drawing illustrating a whole system roughly according to one embodiment of the present disclosure.

Hereinafter, one embodiment of the present disclosure is explained with reference to the accompanying drawings. A vehicle device 2 of a system 1 is connected to an external network 5 via a mobile communication terminal 3 and a base station 4, and communicates with a server 6 through the network 5. The network 5 includes an Internet communication line network. A client 8 includes the vehicle device 2 and/or the mobile communication terminal 3. A server client system (corresponding to the facility display system) 9 includes the server 6 and the client 8.

The server 6 is configured with a computer which includes a CPU, a ROM, and a RAM (not shown), for example, and acts as a server provided with authentication function and data format conversion function. The server 6 is provided with a controller 11, a communication device 12, and a storage unit 13, as functionally illustrated in FIG. 2. The communication device 12 functions for connecting to the network 5. The storage unit 13 stores data for the client authentication. The controller 11 of the server 6 creates display data, upon receiving search data (input data) from the vehicle device 2 through the mobile communication terminal 3. A display data creation unit 11a is realized using software stored in a ROM of the controller 11.

As illustrated in FIG. 1, the server 6 of the system 1 can communicate with contents servers 7a and 7b through the network 5. The outline of the use style of the contents in the system 1 is explained. The server 6 uses various kinds of contents provided by the contents servers 7a and 7b in response to a request of the client 8. Available contents include information distribution service, POI (Point Of Interest) search service, SNS, and music streaming service, for example.

These contents are provided by a plurality of contents providers AAA and BBB. These contents are often provided in the data format defined by the contents providers AAA and BBB respectively. The system 1 is provided with the server 6 which is connected between the mobile communication terminal 3 and each of the contents servers 7a and 7b and which performs format conversion of the contents provided in various data formats by the contents providers AAA and BBB.

In the present embodiment, it is assumed that the contents servers 7a and 7b provide the POI search service among the various kinds of services described above. The contents server 7a is connected with one (or more) contents database DB1. The contents server 7b is connected with one or more contents databases DB2, . . . , DBn.

The contents servers 7a and 7b use the respectively connected databases DB1, DB2, . . . , DBn and provide contents under the control of the respective contents providers MA and BBB. The contents databases DB1, . . . , DBn store the facility name (store name), address, and detailed information of many facilities. Each of the contents servers 7a and 7b outputs the facility information which is suitably selected in response to the input data (search data) from the exterior (for example, the server 6 and the vehicle device 2).

Figure 2:
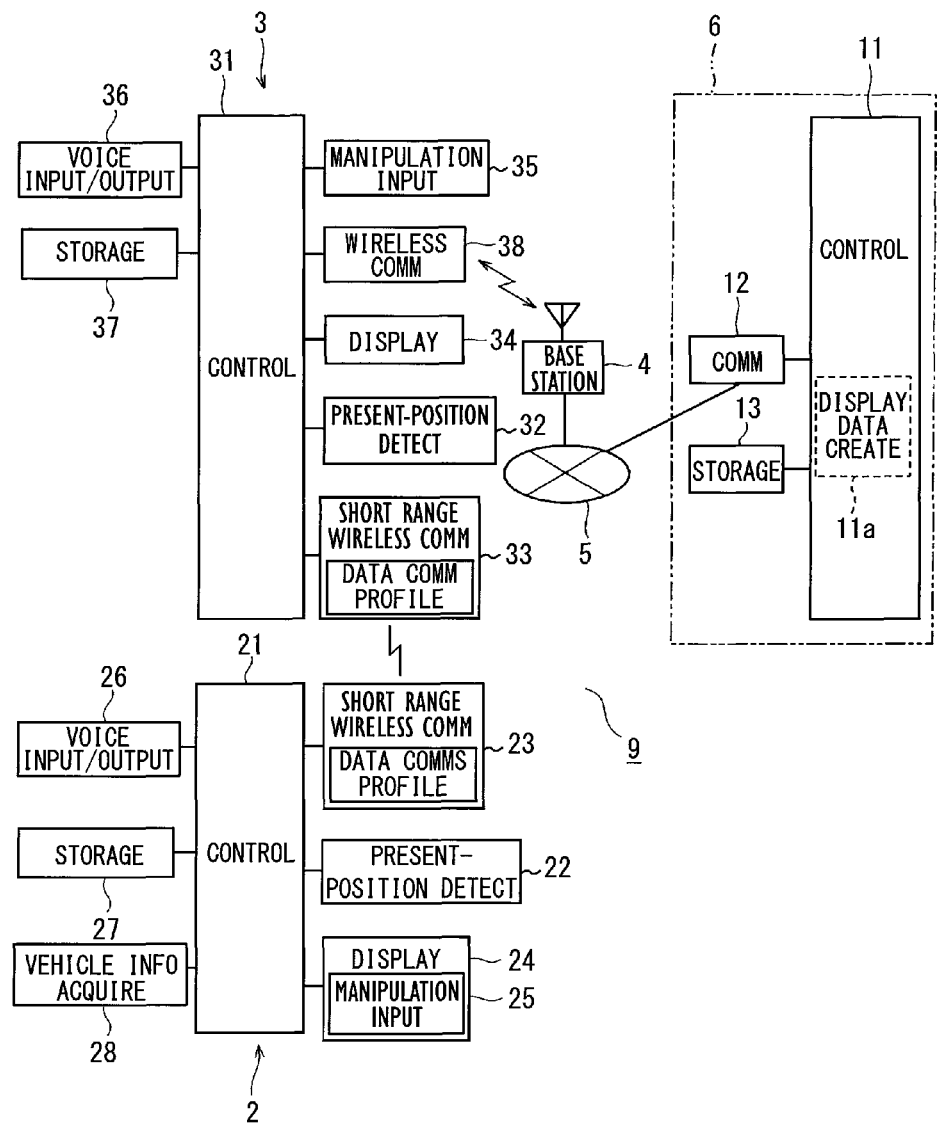
FIG. 2 is a block diagram illustrating roughly the electrical configurations of a vehicle device, a mobile communication terminal, and a server.

The vehicle device 2 illustrated in FIG. 2 is provided with a controller 21. The controller 21 is configured mainly with a microcomputer which includes a CPU and memories such as a ROM and a RAM (not shown), and performs various kinds of control according to a program stored in the ROM. The controller 21 is configured, internally or externally and electrically connected, with a present-position information detector 22, a short distance radio communication unit 23, a display unit 24 to display a variety of information, a manipulation input unit 25, a voice input/output device 26, a storage unit 27, and a vehicle information acquisition unit 28.

The present-position information detector 22 is provided with what is called a GPS unit and a gyro sensor, and detects an own machine position, more specifically the own machine position (latitude and longitude information) of a vehicle in which the vehicle device 2 is provided. The controller 21 executes navigation processing to guide from the present position to a destination, based on the present position detected by the present-position information detector 22.

The voice input/output device 26 is connected with a voice signal processor, a speaker driver, a speaker, a microphone driver, and a microphone (neither is shown), and transmits various kinds of sound signals (voice signals) to the speaker, or inputs sound signals (voice signals) from the microphone.

The storage unit 27 is configured with a hard disk or a nonvolatile storage medium for example, and serves as a database which stores music data, map data to be used for the navigation function, and various kinds of applications to be executed by the vehicle device 2. The storage unit 27 also stores various kinds of computer programs and contents programs, various kinds of programs such as a cooperation application to realize the cooperation function with which contents are executed in mutual cooperation with an external device and a terminal, and image information (image information such as icons A and B to be described later) and picture image data which are used by each program.

The vehicle device 2 cooperates with the mobile communication terminal 3 to execute various applications. The controller 21 of the vehicle device 2 executes an application which enables the use of various kinds of contents provided by the external contents servers 7a and 7b, in cooperation with the mobile communication terminal 3.

The short distance radio communication unit 23 of the vehicle device 2 performs short distance radio communication with a short distance radio communication unit 33 of the mobile communication terminal 3. In the present embodiment, the vehicle device 2 can establish communication connection with the base station 4, via the short distance radio communication unit 23. There is Bluetooth (registered trademark) as a system to establish wireless communication connection between the short distance radio communication units 23 and 33. The short distance radio communication unit 23 establishes a connection with the mobile communication terminal 3, using a profile for data communications, for example.

The display unit 24 is provided with a liquid crystal display unit or an organic EL display unit in which a color display is possible, for example. The display unit 24 displays a manipulation screen of the vehicle device 2, an execution screen of an application, or a map screen at the time of using the navigation function, for example. The manipulation input unit 25 is configured with a touch panel provided on a screen surface of the display unit 24. A user performs manipulation input using the manipulation input unit 14. As the touch panel, it is possible to employ arbitrary systems, such as a pressure sensitive system, an electromagnetic induction system, or an electrostatic induction system. The vehicle information acquisition unit 28 acquires a variety of information about the vehicle. The vehicle information acquisition unit 28 acquires the variety of information about the vehicle, such as speed information of the vehicle and preset temperature of an air-conditioner. Although not shown in the figures, the controller 21 is connected with a communication module (DCM (Data Communication Module)) dedicated for the telematics service, and is enabled to transmit and receive the sound and data for emergency call services with the exterior.

The mobile communication terminal 3 is provided with almost the same electrical configuration as the vehicle device 2 described above. The mobile communication terminal 3 is provided with a controller 31 with a microcomputer (not shown) as a main element. The controller 31 of the mobile communication terminal 3 is configured mainly with the microcomputer which includes a CPU and memories such as a ROM and a RAM (not shown), and performs various kinds of control according to a program stored in the ROM. The controller 31 is configured, internally or externally and electrically connected, with a present-position information detector 32 which detects the present position (latitude and longitude information) of an own machine with a GPS unit, a short distance radio communication unit 33, a display unit 34 for displaying a variety of information, a manipulation input unit 35, a voice input/output device 36, and a storage unit 37.

The present-position information detector 32 can detect a position with the GPS unit or based on the position of the base station 4, and detects the own machine position of the mobile communication terminal 3. The short distance radio communication unit 33 is provided with the same function as the short distance radio communication unit 23 described above; therefore the detailed explanation thereof is omitted here.

The display unit 34 is provided with a liquid crystal display unit or an organic EL display unit in which a color display is possible, for example, and displays an image and a picture stored in the storage unit 37, for example. The storage unit 37 is configured for example with a nonvolatile storage medium and stores various kinds of computer programs and contents programs, various kinds of programs such as a cooperation application to realize the cooperation function with which contents are executed in mutual cooperation with an external device and a terminal, and image information (image information such as icons A and B to be described later) and picture image data which are used by each program.

The manipulation input unit 35 is configured by using a touch panel arranged over a display screen of the display unit 34, and a contact-type switch arranged around the display screen. Information is inputted from the manipulation input unit 35 to the mobile communication terminal 3. As the touch panel, it is possible to employ arbitrary systems, such as a pressure sensitive system, an electromagnetic induction system, or an electrostatic induction system.

The voice input/output device 36 is configured with a voice signal processor, a speaker driver, a speaker, a microphone driver, and a microphone (neither is shown), and transmits various kinds of sound signals (voice signals) to the speaker, or inputs sound signals (voice signals) from the microphone.

The storage unit 37 stores telephone directory data, musical pieces, various kinds of applications to be executed by the mobile communication terminal 3, and data saved by a user. The storage unit 37 also stores image information (image information, such as icons A and B to be described later) and picture image data which are used by each program. The radio communication unit 38 communicates with the base stations 4. As the communication system of the present communication, it is possible to employ various wireless communication systems which are adopted by a common portable terminal; therefore the detailed explanation thereof is omitted.

Figure 3:
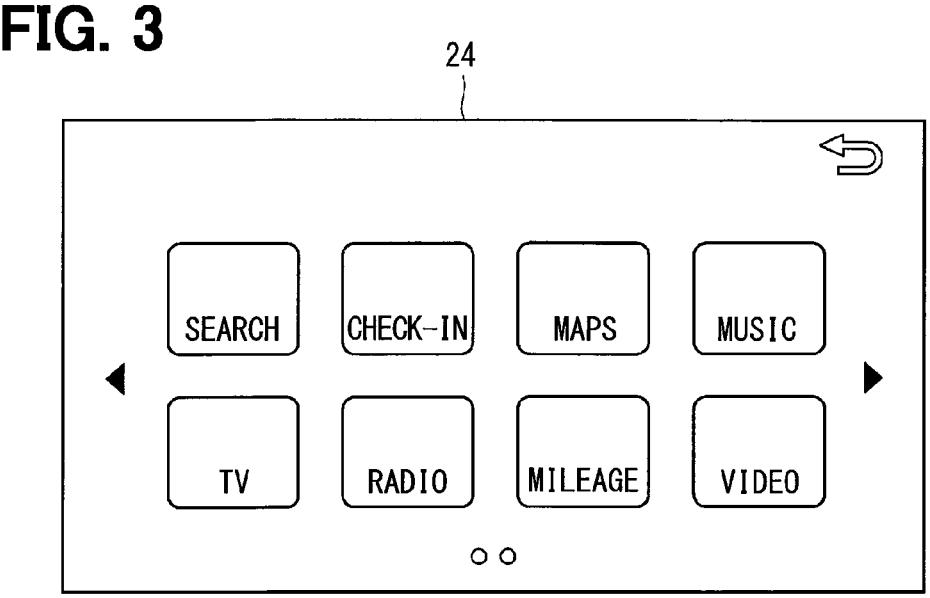
FIG. 3 is a drawing illustrating an example of a menu screen displayed on a display screen of a display unit.

Operation of the configuration described above is explained with reference to a flow chart, a display data list, and the various screens, illustrated in FIG. 3-FIG. 12. As illustrated in FIG. 3, the controller 21 of the vehicle device 2 displays a menu screen on the display screen of the display unit 24. In the example screen illustrated in FIG. 3, various buttons, such as "search", "check-in", "maps", "music", "television", "radio", "fuel consumption", and "video", are displayed, and a user is requested to choose one of them. Here, when a "search" button is depressed, the controller 21 of the vehicle device 2 detects a depression signal and starts execution of the facility search for which the user asks.

Figure 4:
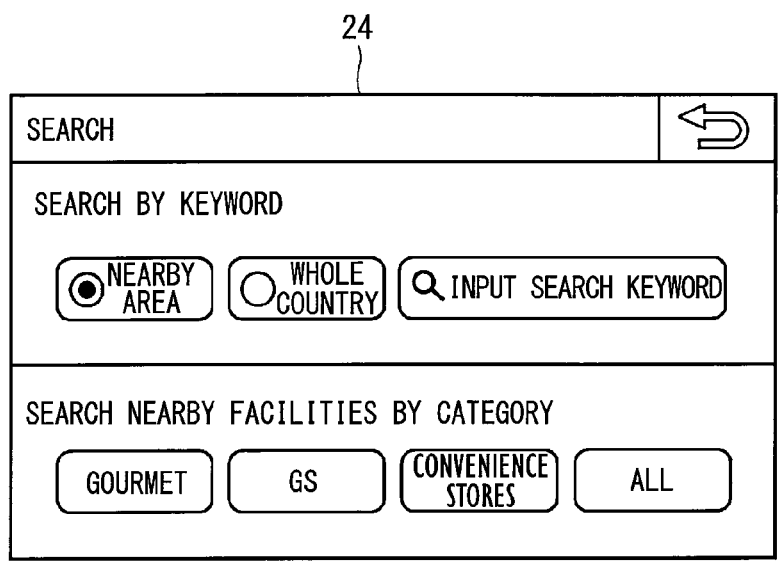
FIG. 4 is a drawing illustrating an example of a submenu screen displayed on the display screen of the display unit.

At this time, the controller 21 of the vehicle device 2 displays a detailed search screen as illustrated in FIG. 4 on the display screen of the display unit 24. When other buttons (for example, "check-in", "maps", "music", "television") are depressed, the function reflecting the displayed content is realized. Since this is not related to the feature of the present embodiment, the detailed explanation thereof is omitted.

When a "gourmet" button illustrated in FIG. 4 is depressed by the user operating the manipulation input unit 25, the controller 21 detects a depression signal and displays a detailed search screen about the "gourmet" (for example, "Japanese food" and "Western food"). The present detailed search screen shows the detailed contents of the "gourmet", but the details thereof are not described. Various buttons are displayed on the display screen of the display unit 24, and the user is requested to make a choice among the detailed contents.

Subsequently, when the search word "Japanese food", for example, is inputted by the user operating the manipulation input unit 25 (T1 in FIG. 5), the vehicle device 2 transmits the present-position information detected by the present-position information detector 22 together with the search word, to the server 6 via the short distance radio communication units 23 and 33, the base station 4, and the network 5 (T2 in FIG. 5), and waits for the response of the server 6 (T3 in FIG. 5).

Figure 6:
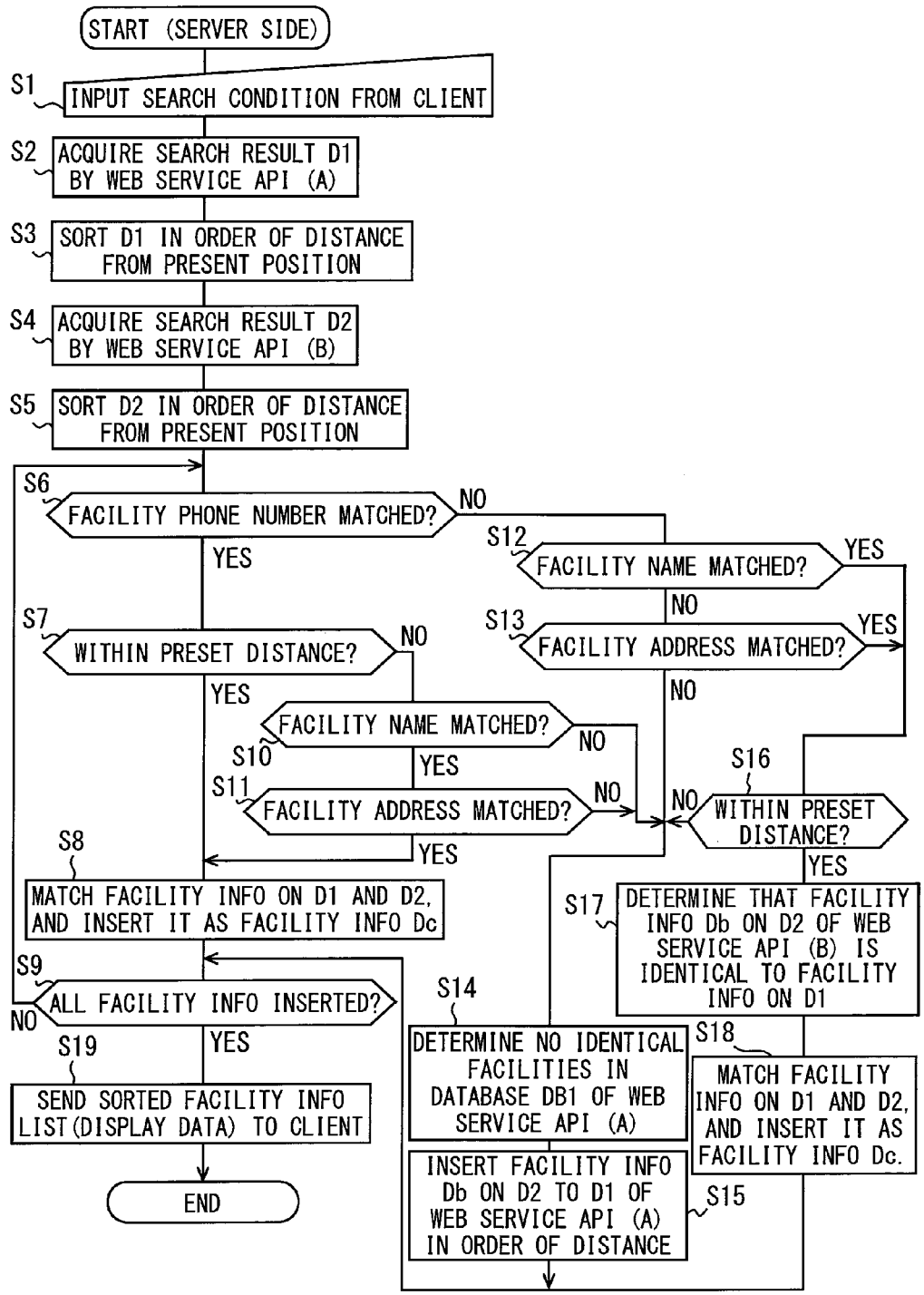
FIG. 6 is a flow chart illustrating roughly processing of a server side.

As illustrated in FIG. 6, when the server 6 receives a search condition from the vehicle device 2 (51 in FIG. 6), the server 6 inputs the search condition into the contents server 7a via the network 5, and acquires a search result D1 (corresponding to the first facility information group) by the web service API (A) provided by the contents provider AAA (S2 in FIG. 6).

The search result D1 includes a facility name (name of a store), an address, and detailed information of one or more facilities selected from a database DB1 by the contents server 7a. The web service API (A) is an API provided by the contents server 7a which is managed by a specified contents provider MA. When the search result D1 is acquired, the server 6 sorts the search result D1 in the order of distance near from the present position (corresponding to the predetermined position), according to the present-position information supplied from the vehicle device 2 (S3).

FIG. 7 illustrates the list image result obtained by sorting the search result D1 in the order of distance, in the server 6. Here, the server 6 manages the provider information Ca (for example, icon A) indicating a service provider of the web service API (A) or a data provider of the database DB1 in association with the name of the facility, the address, and the detailed information of the facility.

The server 6 inputs the same search condition as described above to the contents server 7b via the network 5, and acquires a search result D2 (corresponding to the second facility information group) according to the web service API (B) provided by the contents provider BBB (S4).

The search result D2 includes a facility name (name of a store), an address, and detailed information of one or more facilities which the contents server 7b selects from databases DB2, . . . , DBn. The web service API (B) is an API provided by the contents server 7b which is managed by a contents provider BBB. When the search result D2 is acquired, the server 6 sorts the search result D2 in the order of distance near from the present position, according to the present-position information (latitude and longitude information) supplied from the vehicle device 2 (S5 in FIG. 6).

FIG. 8 illustrates the list image result obtained by sorting the search result D2 in the order of distance, in the server 6. Here, the controller 11 of the server 6 associates the provider information Cb (for example, icon B) indicating a service provider of the web service API (B) or a data provider of the database DB2 with the name of the facility (store name), the address, and the detailed information of the facility, and manages them in the storage unit 13 connected to the controller 11, Then, the controller 11 of the server 6 creates a list in which all the facility information of the search result D2 is sorted in the order of distance and combined into the search result D1 (S6-S18 in FIG. 6), and transmits the facility information (display data) which has been sorted (aligned) in the order of distance, to the vehicle device 2 as the client 8 (S19 in FIG. 6).

When the server 6 inserts the facility information Db of the search result D2 into the search result D1, it is determined whether there is matching at any of a telephone number, a store name (facility name), and address (S6, S12, and S13 in FIG. 6). When it is determined that there is no matching, the server 6 determines that the corresponding facility does not exist in the database DB1 of the web service API (A) (S14), and inserts the facility information Db of the search result D2 into the search result D1 of the web service API (A) in the order of distance (S15 in FIG. 6).

For example, when the server 6 inserts the facility information Db of "seasonal Japanese food V10" of FIG. 8 into the search result D1 of FIG. 7 in the order of distance, this facility information Db is inserted between "Japanese food pub V4" and "creative Japanese-style food V5" as illustrated in FIG. 9.

However, when there is matching at a variety of information, the server 6 matches the facility information Db of the search result D2 with the facility information Da of the search result D1, and inserts it as the facility information Dc (S8 and S18 in FIG. 6). The inventors of the present application have found that a condition which minimizes the variations in the notation is a telephone number rather than the address of the facility or the store name. Accordingly, when there is matching at the telephone number, it is not necessary that there is complete matching at the other conditions (refer to the conditions after S6 in FIG. 6). That is, it may be preferable to employ the telephone number information as the highest priority information in determining whether there are corresponding facilities.

Specifically, in the present embodiment, when any one of the following conditions is fulfilled, the facility information Db of the search result D2 and the facility information Da of the search result D1 are matched and inserted as the facility information Dc (S8 and S18 in FIG. 6). That is:
(A) the telephone number matching and within the predetermined distance (YES at S6 and S7 in FIG. 6);
(B) the telephone number matching, the store name matching, and the address matching (not within the predetermined distance) (YES at S6, S10, and S11, NO at S7 in FIG. 6); and
(C) the store name matching or the address matching (within the predetermined distance) (YES at S12 or S13 and YES at S16, NO at S6 in FIG. 6).

The server 6 determines that there are the corresponding facilities when any one of the conditions (A)-(C) is fulfilled. For example, the address stored in the databases DB1, . . . , DBn may be such as "X chome Y bannchi" in the block number notation, or may be hyphenated as "X-Y" even though it is the same block number.

Moreover, as for the name of a store, there are many variations in notation, such that "incorporated company" is abbreviated as "Co. Inc." or that "Z branch store" is simply written as "Z store." These cases are interpreted comprehensively and consolidated to the above-described conditions (A)-(C). It is desirable from a viewpoint of information falsification prevention to regard it as the corresponding facilities when any one of the above-described conditions (A)-(C) is fulfilled, without performing complement processing for the presence or absence of a hyphen or for the difference between full width and half width of a numeric character.

FIG. 10 illustrates another example of the search result D2. When the search result D1 of FIG. 7 and the search result D2 of FIG. 10 are compared, the search results D1 and D2 are obtained from the mutually different databases DB1 and DB2; accordingly, the facility information Db of "Japanese food restaurant V3" may be hit and retrieved concurrently.

However, the position information (latitude and longitude information) of "Japanese food restaurant V3" may be registered mutually differently in the databases DB1 and DB2. Therefore, even if the server 6 detects the distance according to the present-position information transmitted from the controller 21 of the vehicle device 2, the distance may not be the same but may be different. The distance information from the present position for "Japanese food restaurant V3" illustrated in FIG. 7 is 200 m, on the other hand, the distance information from the present position for "Japanese food restaurant V3" illustrated in FIG. 10 is 270 m.

The Server 6 matches the facility information Db of "Japanese food restaurant V3" to the facility information Da of "Japanese food restaurant V3", and inserts it as the facility information Dc into the facility information D1 (refer to FIG. 11). That is, the server 6 modifies the distance information "270 m" from the present position of the vehicle device 2 into the distance information "200 m", and inserts the modified facility information Dc to create the list.

In the case of the example illustrated in FIG. 11, the insertion place of the facility information Dc is assigned immediately after the facility name "Japanese food restaurant V3" corresponding to the provider information Ca. However, it may be also preferable that the insertion place is assigned just before the facility name "Japanese food restaurant V3" corresponding to the provider information Ca.

When the insertion of the facility information Db of all the search result D2 is completed (YES at S9 in FIG. 6), the server 6 transmits the facility information list (display data) to the vehicle device 2 via the mobile communication terminal 3 (S19 in FIG. 6).

At this time, the server 6 transmits the service provider information Ca and Cb (corresponding to the display data of icons A and B), the facility name, and the distance information from the present position, as the facility information list for every facility. The service provider information Ca and Cb indicates identification information of the contents providers MA and BBB. In order to restrict the information to be transmitted to the client 8 (the mobile communication terminal 3 or the vehicle device 2) only to the necessary information as much as possible, the server 6 transmits only the service provider information Ca and Cb and the facility name, and does not need to transmit the distance information.

The server 6 transmits the service provider information Ca and Cb to the client 8. However, when the databases DB1, . . . , DBn are provided by mutually different providers, it may be preferable that the server 6 transmits the data provider information of the databases DB1, . . . , DBn (corresponding to the display data of icons A and B) to the client 8.

Figure 5:
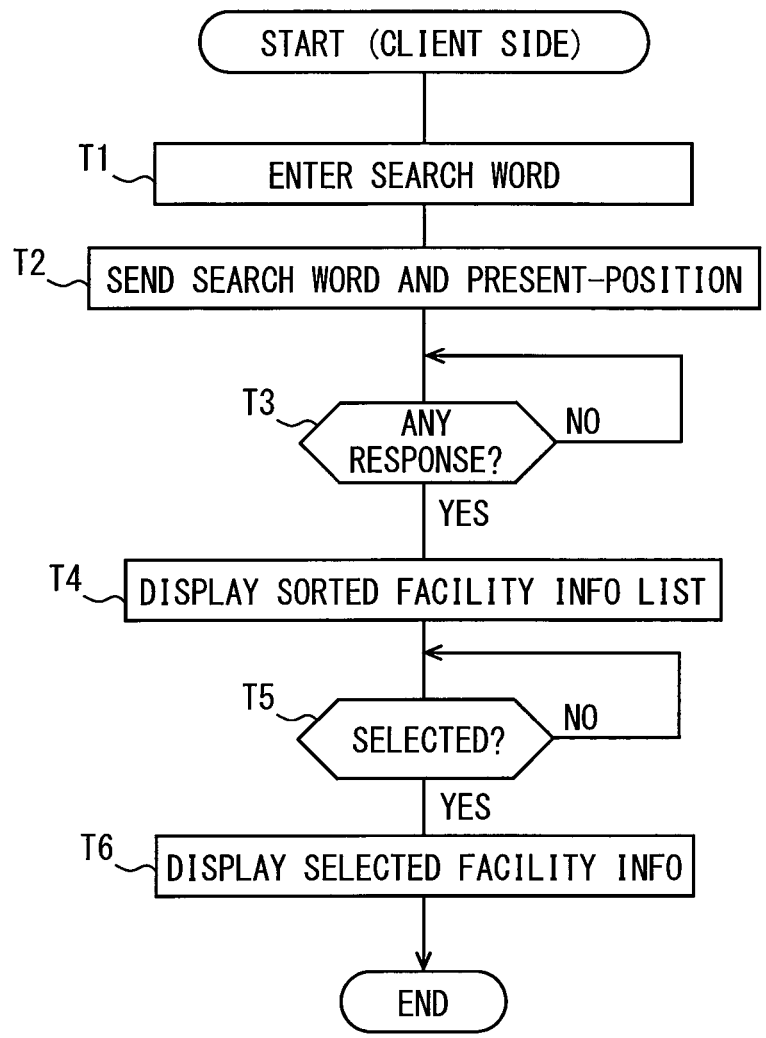
FIG. 5 is a flow chart illustrating roughly processing of a client side.

When the server 6 transmits the facility information list to the vehicle device 2, the controller 21 of the vehicle device 2 determines that the response has been made (YES at T3 in FIG. 5), and displays the sorted facility information list on the display screen of the display unit 24 (T4 in FIG. 5). FIG. 11 illustrates the contents as a list image. The contents of the screen display of the display unit 24 at this time are almost the same as the contents illustrated in FIG. 11.

That is, the controller 21 of the vehicle device 2 displays a facility name to search (a sushi-bar V1, a Kappo (Japanese-style restaurant) V2, a Japanese food restaurant V3, . . . ) and the distance from the present position (100 m, 150 m, 200 m, . . . ) on the display screen of the display unit 24. Considering the provider information Ca and Cb transmitted from the server 6 as the identification information, the controller 21 of the vehicle device 2 displays the image information of icons A and B, which is associated with the identification information and stored in the storage unit 27, on the display screen of the display unit 24.

Then, the corresponding facilities ("Japanese food restaurant V3") are displayed anteroposteriorly (one above the other) in the vehicle device 2; accordingly, it is easy for the user to recognize that they are the corresponding facilities. Furthermore, the vehicle device 2 displays the corresponding facilities at the same distance from the present position, on the display screen of the display unit 24; therefore, the user gets hardly confused.

When the server 6 transmits the facility information list without including the distance information to the client 8 (the mobile communication terminal 3 or the vehicle device 2), the server 6 can acquire the position information on the facilities from the contents servers 7a and 7b, and can transmit them to the client 8. As described above, when the server 6 transmits the position information on the corresponding facilities, it may be preferable that either piece of the position information may be transmitted, or both pieces of the position information may be transmitted allowing the client 8 to choose one.

Then, using the present-position information detected by the present-position information detector 32 or 22 of the client 8 as the above-described distance information, the client 8 can compute the distance to the position information of the facilities transmitted from the server 6 and can display it on the display screen of the display unit 34 or 24. In this case, when the distance is computed using the position information of the client 8 (especially, the vehicle device 2), the distance accuracy to the facilities indicated by the server 6 becomes higher than the distance accuracy computed by the server 6; accordingly it may be preferable for the user.

Figure 12:
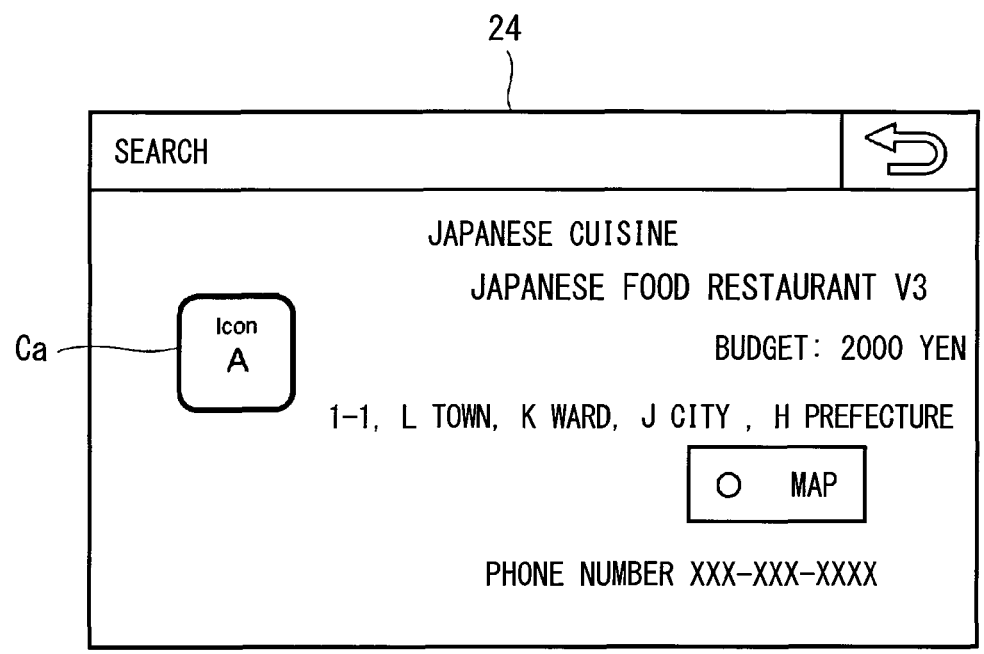
FIG. 12 is a drawing illustrating a display example of a detailed screen.

When "Japanese food restaurant V3" of the provider information Ca is depressed and chosen by the operation of the user on the manipulation input unit 14, for example (T5 in FIG. 5), the vehicle device 2 displays on the display screen of the display unit 24 the detailed information illustrated in FIG. 12 (T6 in FIG. 5).

The detailed information at this time is a WEB page which the contents provider MA has registered to the contents server 7a. When "Japanese food restaurant V3" of the provider information Cb is chosen at Step T5 in FIG. 5 for example, the WEB page which the contents provider BBB has registered to the contents server 7b is displayed on the display screen of the display unit 24.

In this case, the vehicle device 2 is connected to the contents server 7a or 7b via the network 5, acquires the contents of the detailed information, and displays them on the display screen of the display unit 24. As illustrated in FIG. 12, the service provider information Ca is displayed on the display screen of the display unit 24 with the detailed information of the facility.

According to the present embodiment, the server 6 acquires the facility information from each of the databases DB1, DB2, . . . , DBn by the web service API (A) and (B) via the contents servers 7a and 7b. Then, sorting the facility information in the order of distance from the present position of the vehicle device 2, the server 6 creates the display data to display the facility information for the corresponding facilities among the databases DB1, DB2, . . . , DBn, adjacently and independently of the order of distance.

Therefore, for example, when the server 6 transmits the display data to the vehicle device 2 via the mobile communication terminal 3 and the controller 21 of the vehicle device 2 displays the display data on the display screen of the display unit 24, the corresponding facilities can be displayed adjacently, anteroposteriorly (one above the other), independently of the order of distance. Accordingly, it is possible to make the user recognize that the items of facility information displayed adjacently, anteroposteriorly (one above the other), correspond to each other, and it is possible to prevent the erroneous recognition by the user as much as possible.

The controller 11 of the server 6 or the controller 21 of the vehicle device 2 of the client 8 creates the display data to display adjacently the distance information of the corresponding facilities after matching them to each other. Therefore, when the display data is displayed on the display unit 24 of the vehicle device 2, it is possible to make the user recognize that the distances of the facility information, displayed adjacently and anteroposteriorly (one above the other), correspond, and it is possible to prevent the user from erroneously recognizing that the facilities are different facilities.

The server 6 transmits the provider information Ca and Cb (identification information) of the service provider or the data provider to the vehicle device 2. The controller 21 of the vehicle device 2 displays the image information of the icons A and B which use the provider information Ca and Cb as the identification information, on the display screen of the display unit 24. Accordingly, it is possible for the user to recognize the service provider or the data provider easily.

The server 6 inputs the search condition to each web service API (A) and (B) provided by the contents servers 7a and 7b, and retrieves the facility information from the databases DB1 and DB2, respectively. Therefore, a suitable application to various kinds of service enterprises through the network 5 is possible.

The server 6 determines the corresponding facilities based on the conditions (A)-(C) described above; therefore, it is possible to strictly determine whether or not there is matching at the facility information stored in each of the databases DB1, . . . , DBn.

When the server 6 creates the display data for the client 8 (the vehicle device 2 or the mobile communication terminal 3), it results in mitigating the processing burden of the client 8.

In the present embodiment, the vehicle device 2 communicates with the base stations 4 via the mobile communication terminal 3. The vehicle device 2 can make data transmission and reception by short distance radio communication with the mobile communication terminals 3 using the short distance radio communication units 23 and 33. Therefore, it is possible to perform a linked display of the facility information also on the display screen of the mobile communication terminal 3. That is, when the controller 31 of the mobile communication terminal 3 displays the facility information on the display screen of the display unit 34, each facility information is displayed with the distance information. The controller 31 uses the provider information Ca and Cb transmitted from the server 6 as the identification information, and displays on the display screen of the display unit 24 the image information of icons A and B together with the facility information. Here, the icons A and B are associated with the identification information and stored in the storage unit 37. Accordingly, it is possible to realize the linked display, and to enhance the convenience.

(Other Embodiments)

The embodiment of the present disclosure is not restricted to the above-described embodiment; however, for example, the modification or extension described below is possible.

The display data creation function by the display data creation unit 11a is realized when the computer composing the controller 11 executes software stored in the ROM. However, it may be also preferable that the function is realized when the microcomputer composing the controllers 21 and 31 executes the software stored in a storage unit such as a ROM.

The application is possible to the mode in which processing is performed only by the vehicle device 2 or the mobile communication terminal 3 without the intermediary of the network 5. If the vehicle device 2 and/or the mobile communication terminal 3 are provided with a plurality of map data bases (the storage unit 27, the storage unit 37) for searching for facilities, the facility information stored in these map data bases may differ mutually. Then, it may be preferable to create the display data to display matched facilities, adjacently and independently of the order of distance, by employing the technology of the above-described embodiment on the side of the client 8.

When the owner of a store (facility) is changed, for example, only the name of the store registered in the database DB1 may be changed, but no registration change may take place in the other database such as DB2. In preparation for such cases, it may be preferable to ignore the name of the stores registered in the databases DB1 and DB2 but to consider them as matched facilities on conditions that other conditions, such as the telephone number or the address, are matched, and to display them adjacently. Then, even if the owner of the store is changed and only the database DB1 is updated, for example, it is possible to recognize the facilities stored in the databases DB1 and DB2 as the matched facilities and to display them adjacently; accordingly, the user can comprehend the situation easily.

There may be matching between a facility of the map data stored in the storage unit 27 of the vehicle device 2 and a facility in the databases DB1 or DB2, . . . , DBn of the contents servers 7a and 7b on the conditions indicated in the embodiment described above. Therefore, it may be preferable to create the display data to display these facilities adjacently and independently of the order of distance.

The creation subject of these kinds of display data may be any of the controller 11 of the server 6, the controller 21 of the vehicle device 2, and the controller 31 of the mobile communication terminal 3. The function of each means (each processing unit) of the device for creating facility display data may be performed by not only the server 6 but also the client 8 including the vehicle device 2 and the mobile communication terminal 3.

The above illustrates the configuration in which the controller 21 of the vehicle device 2 displays the information on the display screen of the display unit 24, according to the distance from the present position. However, the present disclosure may be applied to other configurations in which the distance from various positions (predetermined position) is displayed. When the controller 21 of the vehicle device 2 displays the distances from the present position (predetermined position) adjacently, after matching the distances to each other, the distance information may be matched to either. Sorting in the order of distance is not restricted to the increasing order of distance but may be the decreasing order of distance.

In the embodiment described above, the vehicle device 2 corresponds to an example of the device for creating facility display data. The mobile communication terminal 3 corresponds to an example of the device for creating facility display data. The server 6 corresponds to an example of the device for creating facility display data. The server client system 9 corresponds to an example of the facility display system. The controller 11 corresponds to an example of the first means (the first processing unit), the second means (the second processing unit), the third means (the third processing unit), the fourth means (the fourth processing unit), and the fifth means (the fifth processing unit), respectively. The display data creation unit 11a corresponds to an example of the fourth means (the fourth processing unit) and the fifth means (the fifth processing unit), respectively. The controller 21 corresponds to an example of the first means (the first processing unit), the second means (the second processing unit), the third means (the third processing unit), the fourth means (the fourth processing unit), and the fifth means (the fifth processing unit), respectively. The controller 31 corresponds to an example of the first means (the first processing unit), the second means (the second processing unit), the third means (the third processing unit), the fourth means (the fourth processing unit), and the fifth means (the fifth processing unit), respectively.

Embodiments and configurations of the present disclosure have been illustrated in the above; however, embodiments and configurations according to the present disclosure are not limited to each of the embodiments and each of the configurations described above. Embodiments and configurations which are obtained by combining suitably technical components disclosed in different embodiments and configurations are also within the scope of embodiments and configurations of the present disclosure.

What is claimed is:

1. A facility display data creating device comprising:
   a controller having a microcomputer including a CPU, the controller being configured to:
   retrieve a first facility information group including facility information of one or more first facilities from a first database provided by a first provider according to input data, the first provider including at least one of a first service provider and a first data provider;
   retrieve a second facility information group including facility information of one or more second facilities from a second database provided by a second provider according to the input data, the second provider including at least one of a second service provider and a second data provider, the first provider being different from the second provider;
   determine whether any of the first facilities indicated by the first facility information group match any of the second facilities indicated by the second facility information group;
   modify, in response to determining that a first facility included in the first facility information group matches a second facility included in the second facility information group, first distance information associated with the first facility to match second distance information associated with the second facility;
   create display data to display facility information by combining and sorting the first facility information group and the second facility information group in an order of distance from a predetermined position;
   create the display data to display the facility information of the first facility and the second facility adjacently to each other, the facility information of the first facility including the modified first distance information and the facility information of the second facility including the matching second distance information;
   create the display data to display a first icon indicative of the first provider of the first database in association with and adjacent to the facility information of the one or more first facilities from the first database and to display a second icon indicative of the second provider of the second database in association with and adjacent to the facility information of the one or more second facilities from the second database; and
   transmit the display data to a vehicle device that displays the display data on a display screen of a display unit.

2. The facility display data creating device according to claim 1, wherein the controller is further configured to:
   match the distances from the predetermined position to the corresponding facilities with one of the distance indicated by the first facility information group and the distance indicated by the second facility information group; and
   create the display data to display, together with the facility information of the corresponding facilities, distance information representing the matched distance.

3. The facility display data creating device according to claim 2,
   wherein the controller is further configured to create the display data about the distance information by using position information detected by a present-position information detector on a client side.

4. The facility display data creating device according to claim 2, wherein the controller creates the display data to display first facility information, which indicates distances closer to the vehicle device, and to display second facility information corresponding to the first facility information, which indicates distances that are farther from the first facility information with respect to the vehicle device, adjacent to the first facility information.

5. The facility display data creating device according to claim 3, wherein the controller creates the display data to display the first facility information, which indicates distances closer to the vehicle device, and to display second facility information corresponding to the first facility information, which indicates distances that are farther from the first facility information with respect to the vehicle device, adjacent to the first facility information.

6. The facility display data creating device according to claim 1,
   wherein the controller uses not coincidence of facility name but coincidence of telephone number to determine whether any of the first facilities of the first facility information group corresponds to any of the second facilities of the second facility information group.

7. The facility display data creating device according to claim 1,
   wherein the controller inputs the input data into a first web service API and retrieves the first facility information group about one or more first facilities from the first database, and
   wherein the controller inputs the input data into a second web service API and retrieves the second facility information group about one or more second facilities from the second database.

8. The facility display data creating device according to claim 1, wherein the controller is further configured to:
   create the facility display data in response to a request from the vehicle device;

retrieve the first facility information group including the facility information of one or more first facilities from the first database in response to the input data from a client; and retrieve the second facility information group including the facility information of one or more second facilities from the second database in response to the input data from the client.

9. A facility display system comprising:

a server that includes the facility display data creating device recited in claim 1; and a client included in the vehicle device that transmits present-position information as information of the pre-determined position to the server, receives a result from the server, and displays the result on the display screen of the display unit, wherein the client receives the display data created by the controller from the server, and displays the facility information of the corresponding facilities on the display screen of the display unit.

10. A facility display data creating program stored in a non-transitory computer readable medium that causes a controller of a server or a client constituting a facility display data creating device to execute:

retrieving a first facility information group including facility information of one or more first facilities from a first database provided by a first provider according to input data, the first provider including at least one of a first service provider and a first data provider;

retrieving a second facility information group including facility information of one or more second facilities from a second database provided by a second provider according to the input data, the second provider including at least one of a second service provider and a second data provider, the first provider being different from the second provider;

determining whether any of the first facilities indicated by the first facility information group match any of the second facilities indicated by the second facility information group;

modifying, in response to determining that a first facility included in the first facility information group matches a second facility included in the second facility information group, first distance information associated with the first facility to match second distance information associated with the second facility;

creating display data to display facility information by combining and sorting the first facility information group and the second facility information group in an order of distance from a predetermined position, and creating the display data to display the facility information of the first facility and the second facility adjacently to each other, the facility information of the first facility including the modified first distance information and the facility information of the second facility including the matching second distance information;

creating the display data to display a first icon indicative of the first provider of the first database in association with and adjacent to the facility information of the one or more first facilities from the first database and to display a second icon indicative of the second provider of the second database in association with and adjacent to the facility information of the one or more second facilities from the second database; and transmitting the display data to a vehicle device that displays the display data on a display screen of a display unit.

\* \* \* \* \*